(12) United States Patent  
Nakahara

(10) Patent No.: US 10,990,274 B2  
(45) Date of Patent: Apr. 27, 2021

(54) INFORMATION PROCESSING PROGRAM, INFORMATION PROCESSING METHOD, AND INFORMATION PROCESSING DEVICE

(71) Applicant: CYGAMES, INC., Tokyo (JP)

(72) Inventor: Kensuke Nakahara, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/406,753

(22) Filed: May 8, 2019

(65) Prior Publication Data

US 2019/0265882 A1   Aug. 29, 2019

Related U.S. Application Data

(63) Continuation of application No. PCT/JP2017/040156, filed on Nov. 7, 2017.

(30) Foreign Application Priority Data

Nov. 10, 2016   (JP) .............................. JP2016-219538

(51) Int. Cl.
  *G06F 3/0481*   (2013.01)
  *G06F 3/0484*   (2013.01)
  (Continued)

(52) U.S. Cl.
  CPC ...... *G06F 3/04883* (2013.01); *A63F 13/2145* (2014.09); *A63F 13/426* (2014.09);
  (Continued)

(58) Field of Classification Search
  CPC ............... G06F 3/04883; G06F 3/0488; G06F 3/04815; G06F 3/04845;
  (Continued)

(56) References Cited

U.S. PATENT DOCUMENTS 8,379,098 B2 * 2/2013 Rottler ................ G06F 3/04883  
                                                          348/211.6  
10,444,871 B2 * 10/2019 Wang .................. A63F 13/2145  
(Continued)

FOREIGN PATENT DOCUMENTS

CN    105335064 A  *  2/2016  ......... A63F 13/5378  
EP      3312710 A1  *  4/2018  ............. G06F 3/044  
(Continued)

OTHER PUBLICATIONS

Cooldown for spell on a widget?, Feb. 14, 2015, 9 pages (Year: 2015).*

(Continued)

*Primary Examiner* — Yongjia Pan  
(74) *Attorney, Agent, or Firm* — Osha Bergman Watanabe & Burton LLP

(57) ABSTRACT

A touch operation management unit detects, at prescribed time intervals, whether or not a touch operation has been performed on a touch operation input unit, and manages the touch operation. A state detection unit detects various kinds of states of a swipe operation performed by the player. A movement instruction acceptance unit accepts a movement instruction among various kinds of touch operations managed by the touch operation management unit. A skill instruction acceptance unit accepts a skill-related instruction among various kinds of touch operations detected by the touch operation management unit. In addition, the skill instruction acceptance unit accepts the designation of a prescribed direction in accordance with the movement direction of a touched position when the swipe transitions from the second state to the third state. A display image generation unit generates a display image for displaying various kinds of controllers. A display control unit executes control for (Continued)

displaying display images for various kinds of games on the display unit.

9 Claims, 7 Drawing Sheets

(51) Int. Cl.
    *G06F 3/0488* (2013.01)
    *A63F 13/2145* (2014.01)
    *A63F 13/426* (2014.01)
    *A63F 13/533* (2014.01)
    *A63F 13/55* (2014.01)

(52) U.S. Cl.
    CPC ........ *G06F 3/0488* (2013.01); *G06F 3/04815* (2013.01); *G06F 3/04845* (2013.01); *A63F 13/533* (2014.09); *A63F 13/55* (2014.09); *A63F 2300/1075* (2013.01); *A63F 2300/6045* (2013.01); *G06F 2203/04808* (2013.01)

(58) Field of Classification Search
    CPC ........ G06F 2203/04808; A63F 13/2145; A63F 13/426; A63F 13/533; A63F 13/55; A63F 2300/1075; A63F 2300/6045; A63F 13/67; A63F 13/92
    See application file for complete search history.

(56) References Cited

U.S. PATENT DOCUMENTS

| | | | | |
|---|---|---|---|---|
| 10,456,667 | B2* | 10/2019 | Tang | G06F 3/0488 |
| 2011/0077083 | A1* | 3/2011 | Ahn | G06F 3/04845 |
| | | | | 463/37 |
| 2011/0276879 | A1* | 11/2011 | Ando | G06F 3/0488 |
| | | | | 715/702 |
| 2013/0212541 | A1* | 8/2013 | Dolenc | G06F 3/04883 |
| | | | | 715/863 |
| 2014/0066195 | A1* | 3/2014 | Matsui | A63F 13/42 |
| | | | | 463/30 |
| 2014/0066200 | A1* | 3/2014 | Matsui | A63F 13/426 |
| | | | | 463/31 |
| 2014/0111429 | A1* | 4/2014 | Layton | G06F 3/0416 |
| | | | | 345/157 |
| 2015/0049058 | A1* | 2/2015 | Mao | G06F 3/0482 |
| | | | | 345/174 |
| 2015/0363102 | A1* | 12/2015 | Seymour | G06F 3/0488 |
| | | | | 715/810 |
| 2015/0378459 | A1 | 12/2015 | Sawada | |
| 2016/0220902 | A1 | 8/2016 | Howard et al. | |
| 2016/0231923 | A1* | 8/2016 | Shin | G06F 3/04883 |
| 2017/0007921 | A1 | 1/2017 | Baba et al. | |
| 2017/0361230 | A1* | 12/2017 | Tang | A63F 13/58 |
| 2018/0028918 | A1* | 2/2018 | Tang | G06F 3/0484 |

FOREIGN PATENT DOCUMENTS

| | | |
|---|---|---|
| JP | 2007-130367 A | 5/2007 |
| JP | 2014-45966 A | 3/2014 |
| JP | 2015-123244 A | 7/2015 |
| JP | 2016-9473 A | 1/2016 |
| JP | 2016-48571 A | 4/2016 |
| JP | 2016-126514 A | 7/2016 |
| WO | 2016/167094 A1 | 10/2016 |

OTHER PUBLICATIONS

How do I add a cooldown timer to skills/inputs?, Apr. 28, 2014, 3 pages (Year: 2014).*
How do I add a cooldown for a spell?, Feb. 9, 2015, 2 pages (Year: 2015).*
International Search Report issued in Application No. PCT/JP2017/040156, dated Jan. 9, 2018 (4 pages).
Written Opinion issued in International Application No. PCT/JP2017/040156, dated Jan. 9, 2018 (4 pages).
Notice of Reasons for Refusal issued in Japanese Application No. 2016-219538, dated Dec. 20, 2016 (3 pages).
Decision of Grant issued in Japanese Application No. 2016-219538, dated Apr. 18, 2017 (1 page).

* cited by examiner

INFORMATION PROCESSING PROGRAM, INFORMATION PROCESSING METHOD, AND INFORMATION PROCESSING DEVICE

TECHNICAL FIELD

The present invention relates to an information processing program, an information processing method, and an information processing device.

BACKGROUND ART

Recently, in games executed on mobile terminals such as smartphones, images displayed on the mobile terminals are one of the important factors affecting the popularity of the games.

Thus, various attempts have been made at developing technologies for improving the ease of operation of GUIs (Graphical User Interfaces) presented to players.

As a technology for that purpose, there exists, for example, a technology (e.g., see patent document 1) for providing a user interface that behaves as if a player operates a smartphone having elasticity by displaying an object that behaves like an elastic body when the touchscreen is operated.

With the above-described technology, it is possible to issue a plurality of action instructions (e.g., movement of a game character, skill activation etc.) without releasing a finger from the touchscreen during a touch operation.

Patent Document 1: Japanese Unexamined Patent Application, Publication No. 2016-48571

DISCLOSURE OF THE INVENTION

Problems to be Solved by the Invention

However, with the above-described technology, it is merely possible to issue a plurality of action instructions without releasing the finger from a touchscreen during a touch operation, and it is not possible to issue the plurality of action instructions independently.

In other words, with existing technologies including the above-described technology, it is difficult to issue an instruction to perform a plurality of operations simultaneously (e.g., a complex operation in which "a weapon being held is changed from a sword to a bow, which is pointed in the 45° oblique direction and a skill is activated).

In particular, in the field of action games, etc., it is not uncommon that a game progresses in real time, and there is a demand from game players for the development of a user interface that allows, even on a smartphone, etc., an operation with a higher degree of freedom with merely a simple operation that can be performed in a short period of time.

The present invention has been made in view of the situation described above and realizes an operation with a higher degree of freedom for a game player.

Means for Solving the Problems

In order to achieve the above object, an information processing program according to an aspect of the present invention causes the execution of control processing by a computer that executes control to display, on a display medium, an image including a virtual space and a moving object that can move in the virtual space, the control processing including:

a detection step of detecting an operation of bringing one or more objects into contact with or in proximity to the display medium;

a determination step of determining whether to accept a first instruction, which is an instruction related to a movement of the moving object in the virtual space, or to accept, as a second instruction, an instruction related to the moving object and including at least the selection of a kind and the designation of a direction, on the basis of a management state of the number of the one or more objects that are in contact with or in proximity to the display medium and individual positions of the objects corresponding to the number in the display medium; and an acceptance step of accepting the first instruction or the second instruction in accordance with the determination result in the determination step, wherein the detection step includes a step of detecting, as an operation accepted as the second instruction, a series of operations starting from a first state, in which, among the one or more objects, an object for the second instruction identified from the management state and the position has begun to be brought into contact with or in proximity to the display medium, via a second state, in which the object is moved while being maintained in contact with or in proximity to the display medium, to a third state, in which the form of the object with respect to the contact with or proximity to the display medium changes, and the acceptance step includes a step of accepting the selection of a prescribed kind among one or more kinds in accordance with the position of the object for the second instruction when the first state has been detected, accepting the designation of a prescribed direction in accordance with the movement direction of the object when a transition from the second state to the third state occurs, and, at a prescribed timing after the detection of the third state, accepting an instruction for the execution of the second instruction in the prescribed direction with respect to the prescribed kind.

An information processing method and an information processing device corresponding to the above information processing program according to an aspect of the present invention are also provided as an information processing method and an information processing device according to an aspect of the present invention, respectively.

Effects of the Invention

The present invention makes it possible to provide a game player with a technology for realizing an operation with a higher degree of freedom.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images".

Furthermore, "moving images" should be construed to include images that are displayed individually through the following first processing to third processing.

First processing refers to processing for displaying a series of still images, while continuously switching among them as time passes, for the individual actions of objects (e.g., game characters) in planar images (2D images). Specifically, two-dimensional animation, i.e., processing similar to what is called book flipping, is an example of first processing.

Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing.

Third processing refers to processing for preparing videos (i.e., moving images) corresponding to individual actions of objects (e.g., game characters) and rendering the videos as time passes.

Figure 1:
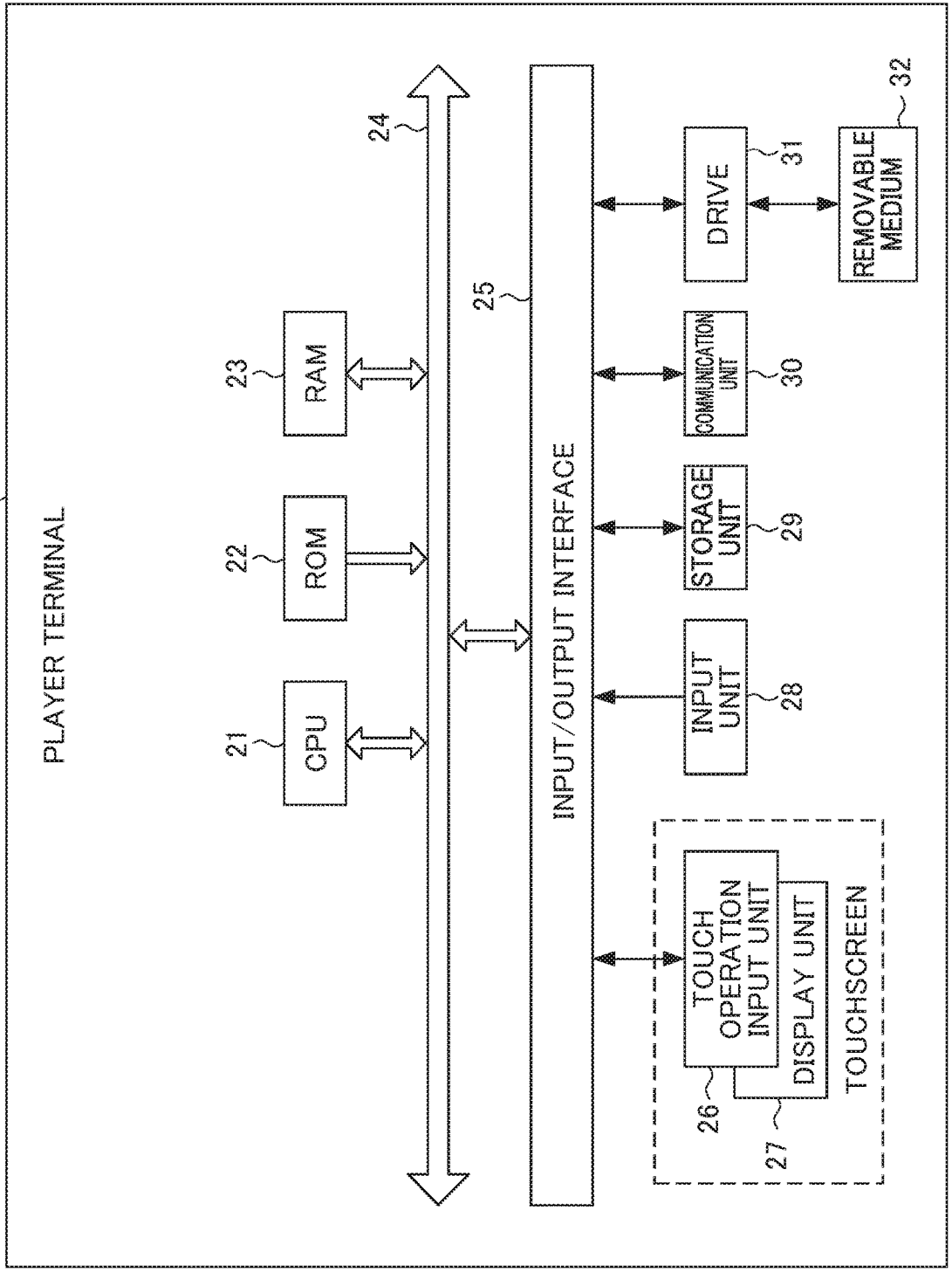
FIG. 1 is a block diagram showing an example of the hardware configuration of a player terminal according to an embodiment of the present invention.

FIG. 1 is a block diagram showing the hardware configuration of a player terminal 1 according to an embodiment of the present invention.

The player terminal 1 is implemented by a smartphone or the like.

The player terminal 1 includes a CPU (Central Processing Unit) 21, a ROM (Read Only Memory) 22, a RAM (Random Access Memory) 23, a bus 24, an input/output interface 25, a touch-operation input unit 26, a display unit 27, an input unit 28, a storage unit 29, a communication unit 30, and a drive 31.

The CPU 21 executes various kinds of processing according to programs recorded in the ROM 22 or programs loaded from the storage unit 29 into the RAM 23.

The RAM 23 also stores, as appropriate, data, etc. that are needed when the CPU 21 executes various kinds of processing.

The CPU 21, the ROM 22, and the RAM 23 are connected to each other via the bus 24. The input/output interface 25 is also connected to the bus 24. The touch-operation input unit 26, the display unit 27, the input unit 28, the storage unit 29, the communication unit 30, and the drive 31 are connected to the input/output interface 25.

The touch-operation input unit 26 is constituted of, for example, capacitive or resistive (pressure-sensitive) position input sensors that are laid over the display unit 27, which detect the coordinates of a position at which a touch operation is performed.

The touch operation here refers to bringing an object into contact with or in proximity to the touch-operation input unit 26. The object that is brought into contact with or in proximity to the touch-operation input unit 26 is, for example, a player's finger or a stylus. Hereinafter, a position at which a touch operation is performed will be referred to as a "touched position", and the coordinates of the touched position will be referred to as "touched coordinates".

In addition, there is the case where multiple touch operations are performed simultaneously, such as the case where the next touch operation is performed before a first touch operation finishes. Such multiple touch operations performed simultaneously will be referred to as a "multi-touch". The touch operation input unit 26 in this embodiment supports multi-touch.

The display unit 27 is implemented by a display, such as a liquid crystal display, and displays various kinds of images, such as images related to a game.

As described above, in this embodiment, a touchscreen is constituted of the touch-operation input unit 26 and the display unit 27.

It is to be understood that, in this specification, what is referred to as a "display medium" does not simply means the display unit 27, but it means the "touchscreen" constituted of the touch-operation input unit 26 and the display unit 27.

Here, examples of the kinds of touch operations on a touchscreen include swipe and flick.

However, both swipe and flick are common in that each of these is a series of operations starting with a first state, in which an object has begun to be brought into contact with or in proximity to the display medium, via a second state, in which the position of the object is changed while being maintained in contact with or in proximity to the display medium, to a third state, in which the object is released from contact with or proximity to the display medium. Thus, such a series of operations will be collectively referred to as a "swipe" in this specification.

In other words, a "swipe" as referred to in this specification is a broad concept including a flick described above, etc. as well as what is generally called a swipe.

The input unit 28 is constituted of various kinds of hardware buttons, etc. and allows input of various kinds of information in accordance with instruction operations performed by a player.

The storage unit 29 is implemented by a DRAM (Dynamic Random Access Memory) or the like and stores various kinds of data.

The communication unit 30 controls communications carried out with other devices (a server (not shown) and other player terminals (not shown)) via a network (not shown) including the Internet.

The drive 31 is provided as needed. A removable medium 32 implemented by a magnetic disk, an optical disk, a magneto-optical disk, a semiconductor memory, or the like is loaded in the drive 31 as appropriate. A program read from the removable medium 32 by the drive 31 is installed in the storage unit 29 as needed. The removable medium 32 can also store various kinds of data stored in the storage unit 29, similarly to the storage unit 29.

Through cooperation between the various kinds of hardware and various kinds of software of the player terminal 1, as shown in FIG. 1, it becomes possible to execute various kinds of games on the player terminal 1.

Figure 2:
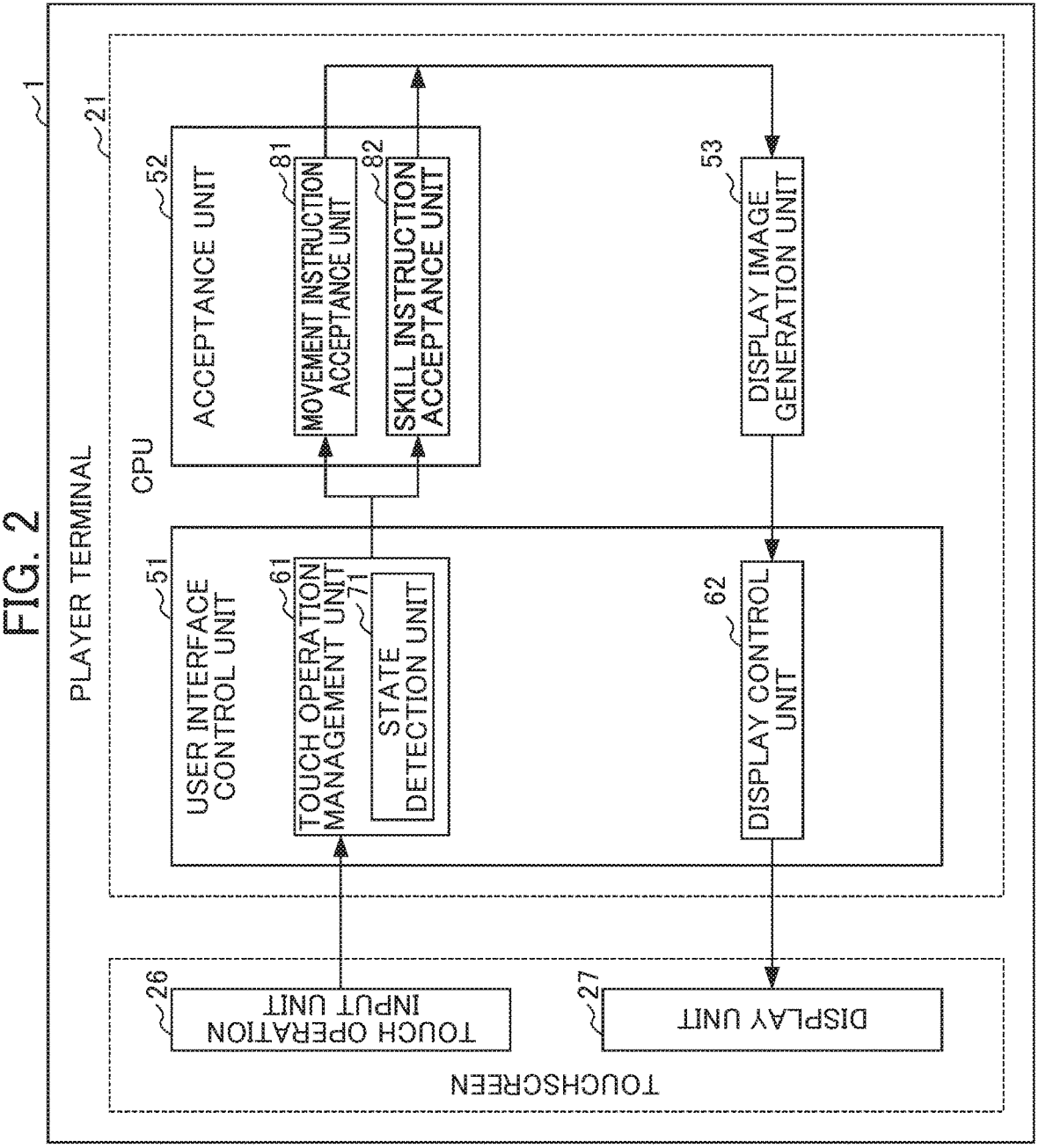
FIG. 2 is a functional block diagram showing an example of the functional configuration of the player terminal in FIG. 1.

That is, the player terminal 1 provides a functional configuration as shown in FIG. 2 when executing various kinds of games.

FIG. 2 is a functional block diagram showing an example of the functional configuration of the player terminal 1 in FIG. 1.

As shown in FIG. 2, the CPU 21 of the player terminal 1 has the functions of a user interface control unit 51, an acceptance unit 52, and a display image generation unit 53.

Although not shown, it is assumed that the CPU 21 has the function of a functional block (game execution unit) for executing a game according to this embodiment.

The user interface control unit 51 executes control of a user interface on a touchscreen at the time of game execution.

The user interface control unit 51 is provided with a touch operation management unit 61 and a display control unit 62.

The touch operation management unit 61 detects, at prescribed time intervals, whether or not a touch operation has been performed on the touch operation input unit 26, and, in the case where a touch operation has been performed, detects the touched position (touched coordinates) thereof.

Here, as described above, the touch operation input unit 26 supports a touch operation with a plurality of fingers, etc., i.e., multi-touch.

Thus, in the case where the touch operation management unit 61 has detected a plurality of touch operations, the touch operation management unit 61 independently manages the individual contents of the plurality of detected touch operations. Specifically, for example, each time the touch operation management unit 61 detects a touch operation, the touch operation management unit 61 identifies the kind of the touch operation and assigns a management number to the touch operation. In this way, the touch operation management unit 61 manages the plurality of individual touch operations by individually associating the identified kinds and the assigned management numbers with each other. This makes it possible to manage the kinds, the chronological order, etc. of the plurality of touch operations.

Here, for a single touch operation (a single touch operation uniquely identified by a management number), the touched positions are sequentially detected at "prescribed time intervals". As described above, the plurality of touched positions detected in this way are used to calculate the change directions, the change amounts, etc. of the touched positions of the single touch operation (the single touch operation uniquely identified by the management number).

That is, "prescribed time intervals" at which the touched positions are detected are not particularly limited as long as these calculations can be performed. However, in this embodiment, it is assumed that a touched position is detected each time a frame is displayed on a touchscreen, and the "prescribed time interval" is a time interval between two frames displayed successively.

That is, in this embodiment, it is assumed that the change direction of a touched position is determined on the basis of the difference between the touched position in the latest frame (hereinafter referred to as a "latest-frame touched position") and the touched position in the frame preceding the latest frame (hereinafter referred to as an "immediately-preceding-frame touched position").

The touch operation management unit 61 is provided with a state detection unit 71.

In the case where a touch operation detected by the touch operation management unit 61 is a swipe, the state detection unit 71 functions so as to detect various kinds of states of the swipe (one of the first state to the third state of the swipe).

The display control unit 62 executes control, which will be described later in detail, for displaying, on a display medium, an image including the content of a game being executed (hereinafter referred to as a "game image").

The acceptance unit 52 accepts various kinds of touch operations detected by the touch operation management unit 61 as in-game instructions.

Here, it is assumed that the game used in this embodiment includes a virtual three-dimensional space (hereinafter referred to simply as a "virtual space") constructed with a prescribed global coordinate system and a game character that is an movable object (moving object) in the virtual space. In this case, a player can issue an instruction related to the movement of the game character (hereinafter referred to as a "movement instruction") by performing a prescribed touch operation. In addition, by performing another prescribed touch operation (a swipe in this embodiment, as will be described later), the player can issue a series of instructions until the skill is activated (hereinafter referred to as "skill-related instructions"), i.e., instructions to select any kind of skill among one or more kinds of skills and designate a prescribed direction in the virtual space as an activation direction of the skill.

In addition, in this embodiment, skills refer to various actions represented by using objects corresponding to game characters and other objects, and the actions are different from simple actions of the game characters such as, for example, attacking with a sword, continuously attacking with a sword, shooting with an arrow, continuously shooting with an arrow, launching an attack with a spell, launching a continuous attack with a spell, holding a shield in front of the character, hitting with a shield. Although the CPU 21 controls a computer by executing processing for representing a plurality of kinds of skills in a game through cooperation with a game program, the CPU 21 controls the computer so as to execute different processing in accordance with a skill to be represented. Thus, selecting a skill corresponds to selecting a kind of control from among a plurality of kinds of control.

In order to control the above-described processing, the acceptance unit 52 is provided with a movement instruction acceptance unit 81 that accepts a touch operation indicating a movement instruction for a game character, and a skill instruction acceptance unit 82 that accepts a touch operation (swipe) indicating a skill-related instruction for the game character.

Here, in this embodiment, it is assumed that a swipe is adopted as a touch operation indicating a skill-related instruction for a game character. In this case, the skill instruction acceptance unit 82 accepts the selection of a prescribed kind from among one or more kinds of skills, in accordance with a touched position when the first touch operation is detected (hereinafter referred to as a "touch start point"), the order of touch operations, etc.

For example, it is assumed that, for each of one or more kinds of skills, a specific area (hereinafter referred to as a "skill selection area") accepting the start of a skill-related instruction for that kind of skill is defined on the display surface of a display medium. Specifically, for example, it is assumed that a first skill selection area is associated with a first kind of skill, and a second skill selection area is associated with a second kind of skill. In this case, in the case where a touched position when the first state of the swipe is detected is included in the first skill selection area, the first kind is selected as the prescribed kind of skill.

Meanwhile, in the case where the touched position when the first state of the swipe is detected is included in the second skill selection area, the second kind is selected as the prescribed kind of skill.

The skill instruction acceptance unit 82 accepts the designation of a prescribed direction in accordance with the movement direction of a touched position when the swipe transitions from the second state to the third state. Here, the prescribed direction means the activation direction of the skill.

Specifically, for example, the skill instruction acceptance unit 82 calculates the change direction of the touched position from the difference between a touched position in a frame displayed when the swipe has transitioned to the third state (latest-frame touched position) and a touched position in an immediately-preceding frame (immediately-preceding-frame touched position), and, with the change direction of the touched position serving as the prescribed direction, accepts an instruction related to the prescribed direction.

In addition, the skill instruction acceptance unit 82 accepts, at a prescribed timing after detecting the third state of the swipe, the instruction related to the activation of the accepted prescribed kind of skill in the accepted prescribed direction.

The display image generation unit 53 generates data for a game image to be displayed on the display unit 27 of the player terminal 1, for example, in this embodiment, a game image including a virtual space and a game character that can be moved in the virtual space.

In this embodiment, this game image can include a software button used to perform an operation for issuing a movement instruction for the game character (hereinafter referred to as a "movement button"), and a software button used to perform an operation (swipe) for issuing a skill-related instruction for the game character (hereinafter referred to as a "skill button").

For example, a skill button is provided for each kind of skill and, with a position inside a skill selection area associated with that kind of skill serving as an initial position, is arranged so as to stick to the initial position for a certain period of time until an operation (swipe) for issuing a skill-related instruction for a game character is performed. Note that, as described in FIG. 3(*b*), which will be described later, the skill button is not always displayed from the start, and may be configured such that the display thereof starts when the first state of the swipe is detected.

The skill button indicating the kind of a selected skill is arranged at a touched position in the second state of the swipe. That is, in the second state of the swipe, since the touched position gradually moves, the skill button also gradually moves in association with the touched position.

The same applies to the case of a movement button.

In this case, in addition to the skill button indicating the current touched position (latest-frame touched position), the skill button arranged at the immediately-preceding-frame touched position (hereinafter referred to as an "immediately-preceding-position button") is left on the game image in a pale color without being deleted, such that the movement direction of the touched position can easily be visually recognized.

That is, as described above, in the game image when the state of the swipe transitions from the second state to the third state, the direction from the immediately-preceding-position button toward the skill button is accepted by the skill instruction acceptance unit 82 as a direction (prescribed direction) in which the skill is activated.

Next, with reference to FIGS. 3(*a*)-3(*d*), the first embodiment of a series of processing steps that cause a game executed by the player terminal 1 in FIG. 1 to progress (hereinafter referred to as "game execution processing") will be described by using an example.

FIGS. 3(*a*)-3(*d*) are an illustration showing an example of the result of game processing executed on the player terminal 1.

In this embodiment, although various three-dimensionally shaped moving objects are used in a game, a separate local coordinate system is set in each moving object, and coordinates in each local coordinate system are converted to coordinates in the global coordinate system and arranged in a virtual space. As such moving objects, in the example in FIGS. 3(*a*)-3(*d*), a character C1 representing a game character to be operated by a player, and a character C2 representing a game character to be attacked are arranged in a virtual space. In addition, the movement of the character C1 means a change of coordinates of the character C1 in the global coordinate system (i.e., in the virtual space).

Here, as the kinds of touch operations (hereinafter referred to as "operation kinds", as appropriate), the touch operation management unit 61 in this embodiment identifies and manages three kinds, i.e., at least an operation kind a, an operation kind b, and an operation kind c.

That is, the operation kind a of a touch operation is a kind indicating a touch operation related to the movement instruction for the character C1.

The operation kind b of a touch operation is a kind indicating a touch operation related to a skill-related instruction for the character C1, the touch start point of the touch operation being an area other than skill selection areas (e.g., an area other than areas in which the above-described skill buttons are displayed, which will hereinafter be referred to as a "free processing area").

The operation kind c of a touch operation is a kind indicating a touch operation related to a skill-related instruction for the character C1, the touch start point of the touch operation being the inside of an area in a skill selection area (e.g., an area in which one of the above-described skill buttons is displayed).

That is, when a touch operation is detected, the touch operation management unit 61 first determines the kind of the touch operation, from the above-described operation kinds a to c. Then, the touch operation the operation kind of which has been determined is managed together with a management number assigned by the touch operation management unit 61 until the end of the touch operation.

Note that, in this embodiment, in order to distinguish the movement instruction to the character C1 from other kinds of instructions, instructions for different operations from the movement of the character C1 (different control from movement control) are collectively defined as skill-related instructions for convenience. However, although touch operations of the operation kind b and the operation kind c are both touch operations corresponding to the skill-related instructions, each of these operations is associated with a mutually different kind of skill. That is, it can said that processing controlled by the operation kind b and processing controlled by the operation kind c are the same kinds of processing in that both are not movement processing, but are mutually different kinds of processing in terms of the processing contents themselves.

In the example in FIGS. 3(*a*)-3(*d*), a movement button MP is adopted as a virtual controller for inputting a movement instruction for the character C1.

In accordance with a prescribed touch operation on the movement button MP by a player, one or more kinds of quantities related to the movement direction of the character C1 change. Here, although the kinds of the changing quantities are not particularly limited as long as they are related to movement, in this embodiment, changes of the character C1 in the global coordinate system in a virtual space, i.e., the movement amount, the movement direction, the movement speed, etc. of the character C1 are assumed.

In addition, although the method of a prescribed instruction from the player to the movement button MP is not particularly limited as long as it is a touch operation, a swipe is adopted in this embodiment.

A skill button AP, a skill button BP, and a skill button HP shown in FIGS. 3(a)-(d) are virtual controllers for inputting mutually different kinds of skill-related instructions for three kinds of individual skills of the character C1.

Note that an immediately-preceding-position button TP is displayed, in a pale color, at an immediately-preceding touched position in a swipe target, i.e., one of the movement button MP, the skill button AP, the skill button BP, and the skill button HP.

Figure 3A:
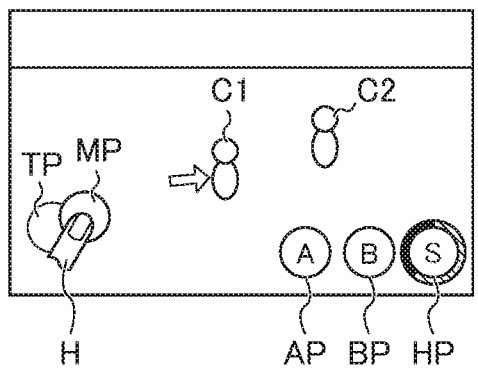
FIGS. 3(a)-3(d) are an illustration showing an example of the result of game execution processing executed on the player terminal in FIG. 2.

FIG. 3(a) shows a situation in which the character C1 in a game moves.

As shown in FIG. 3(a), the skill button AP, the skill button BP, and the skill button HP are arranged in a game image as the user interface displayed to a player.

First, the case where the player wishes to move the character C1 in the game and performs a touch operation on a free processing area on a display screen of the display unit 27 (display medium), i.e., the case where a touch operation of the above-described operation kind a is performed, will be described.

Note that the free processing area is an area other than skill selection areas. As described above, the skill selection areas are areas in which controllers that are displayed in the game screen for skill activation are displayed. In the example in FIGS. 3(a)-3(d), the skill selection areas are areas in which the skill button AP, the skill button BP, and the skill button HP are displayed, respectively.

In this case, when a touch operation by the player is detected, the touch operation management unit 61 determines whether or not the kind of the touch operation is the operation kind c on the basis of the touch start point of the touch operation.

Although not shown in FIG. 3(a), in the case where the touch start point of the touch operation is within a skill selection area, it is determined that the kind of the touch operation by the player is the operation kind c. In this case, the touch operation indicates a skill-related instruction regardless of the order or timing of the touch operation.

Meanwhile, as in the example in FIG. 3(a), in the case where the touch start point of the touch operation is within the free processing area, it is determined that the kind of the touch operation is not the operation kind c. In this case, the touch operation management unit 61 determines, on the basis of the order in which or the timing at which the touch operation has been performed by the player, whether the touch operation indicates a movement instruction or a skill-related instruction.

In addition, the touch operation management unit 61 checks whether or not there is a touch operation already being managed (another touch operation to which a management number has been assigned) at the time when the touch operation by the player is detected.

In the case where it is determined that there is no other touch operation being managed, the touch operation management unit 61 starts to manage the detected touch operation as if having a management number 1. The touch operation on the free processing area, which is managed as if having the management number 1 as described above, is a touch operation of the operation kind a.

The movement instruction acceptance unit 81 accepts the touch operation of the operation kind a as a movement instruction. Processing for the case where there is a touch operation already being managed at the time when the touch operation is detected by the touch operation management unit 61 will be described later.

In addition, in this example, the movement button MP is displayed at the touched position. The player can perform an operation for freely moving the movement button MP while maintaining contact with the movement button MP with his/her finger H (i.e., a movement instruction in the second state of the swipe).

As described above, since touched positions are detected individually at prescribed time intervals, the movement button MP is displayed at the detected position of each touched position. Thus, when the touched position sequentially changes, the player visually recognizes as if the movement button MP gradually moves along the changing touched position.

This change of the touched position is also given as an instruction to the character C1 regarding a movement direction, and the character C1 moves in accordance with the instruction.

That is, the motion of the movement button MP that moves in accordance with the change of the position touched by the finger H in the second state of the swipe and the motion of the character C1 are coordinated with each other.

In addition, in the case where a movement instruction to the character C1 is given, it is possible to simultaneously instruct the orientation of the character C1.

For example, in FIG. 3(a), in the case where the player swipes in the right direction on the display screen, the movement of the character C1 is controlled on the basis of the instruction by the swipe in the right direction, and the "orientation" of the character C1 is also simultaneously controlled on the basis of the right swipe direction.

Here, when considering a certain face of a 3D object forming the character C1 as a front face, the orientation of the character C1 is the direction in which the front face faces. However, in this embodiment, the control of the orientation of the character C1 is performed by means of rotation control with the center of the 3D object forming the character C1 serving as an axis.

In addition, the orientation of the character C1 is also coordinated with the activation direction of a skill. In addition, in the case where a skill-related instruction is issued together with or independently of the movement instruction, the skill-related instruction is given a higher priority and the orientation of the character C1 changes on the basis of the swipe corresponding to the skill-related instruction. That is, while the movement instruction for the character C1 is being accepted by the movement instruction acceptance unit 81, the orientation of the character C1 is controlled on the basis of the content of the swipe corresponding to the movement instruction, but when the skill-related instruction is accepted by the skill instruction acceptance unit 82 during this period, the orientation of the character C1 is controlled on the basis of the content of the swipe corresponding to the skill-related instruction.

Figure 3B:
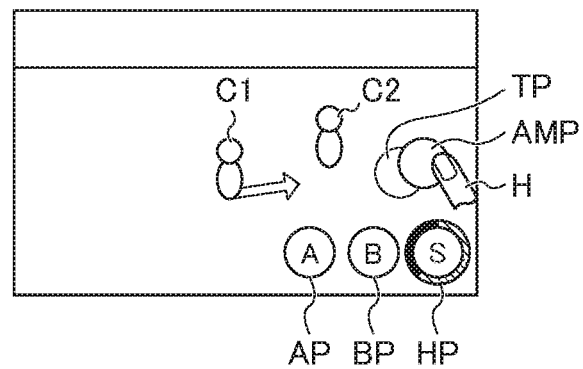

FIG. 3(b) shows a situation in which the character C1 in a game activates a skill.

In the example in FIG. 3(b), it is assumed that the operation in FIG. 3(a) is continuing and the touch operation management unit 61 is managing the touch operation having the management number 1 (the touch operation of the operation kind a, which indicates the movement instruction to the character C1).

Continuing from the state in FIG. 3(a), the case where the player wishes to cause the character C1 in the game to activate a skill A and performs a touch operation on the free processing area, i.e., the case where a touch operation of the above-described operation kind b is performed will be described.

When a touch operation by the player is detected, the touch operation management unit 61 determines whether or not the kind of the touch operation is the operation kind c on the basis of the touch start point of the touch operation.

In the example in FIG. 3(b), since the touch start point is within the free processing area, the touch operation is not a touch operation of the operation kind c.

Thus, it is checked whether or not there is a touch operation already being managed at the time when the touch operation by the player is detected.

Then, in the case where the touch operation already being managed is related to a movement instruction, the touch operation management unit 61 starts the management of the detected touch operation as is having a management number 2. The touch operation on the free processing area, which is managed as if having the management number 2, is a touch operation of the operation kind b.

In the example in FIG. 3(b), since the touch operation already being managed is an operation for instructing a movement, the touch operation in FIG. 3(b) is accepted by the skill instruction acceptance unit 82 as a skill-related instruction.

The skill instruction acceptance unit 82 accepts the touch operation of the operation kind b as a skill-related instruction.

Note that, in the case where the touch operation already being managed is related to a skill-related instruction, the skill instruction acceptance unit 82 does not accept the skill-related instruction because the acceptance of skill-related instructions is deactivated. Here, the deactivation means not accepting skill-related instructions among instructions related to touch operations temporarily only while a skill is being activated.

As a result of the above-described processing, in the example in FIG. 3(b), a skill button AMP for activating the skill A is displayed when the player starts a touch operation.

The player operates the skill button AMP to issue a skill-related instruction for the skill A.

That is, by the player bringing the finger H into contact with the inside of the skill selection area for the skill A (except for the position on which the skill button AP is arranged), the state of a swipe transitions to the first state, the skill button AMP is displayed on the contact position of the finger H, and the skill A is selected as a skill to be activated.

The player moves the skill button AMP while keeping the finger H in contact with the skill button AMP. This makes the swipe transition to the second state. In the example in FIG. 3(b), the player moves, in the second state of the swipe, the skill button AMP in a prescribed direction while keeping the finger H in contact with the skill button AMP, and releases the finger H from the touchscreen at a prescribed position. That is, the state of the swipe transitions from the second state to the third state.

The direction from the position touched by the finger H immediately before the time of this transition (immediately-preceding-frame touched position, i.e., the position of the immediately-preceding-position button TP) toward the position touched by the finger H at the time of this transition (latest-frame touched position, i.e., the position of the skill button AMP) is set as the activation direction of the skill. As a result, the character C1 activates the skill A toward the character C2 existing in the activation direction.

Note that, similarly to the case described above, in the case where the player swipes in the right direction on the display screen, it is possible to issue the skill-related instruction to the character C1 on the basis of the instruction by swiping in the right direction, and also to simultaneously control the "orientation" of the character C1 on the basis of the right swipe direction.

In addition, similarly to the case described above, since the orientation of the character C1 is also coordinated with the activation direction of a skill, in the case where a skill-related instruction is issued together with or independently of a movement instruction, the skill-related instruction is given a higher priority and the orientation of the character C1 changes. This makes it possible for the player to easily identify the direction in which the skill is activated regardless of the direction in which the character C1 moves in the global coordinate system.

Figure 3C:
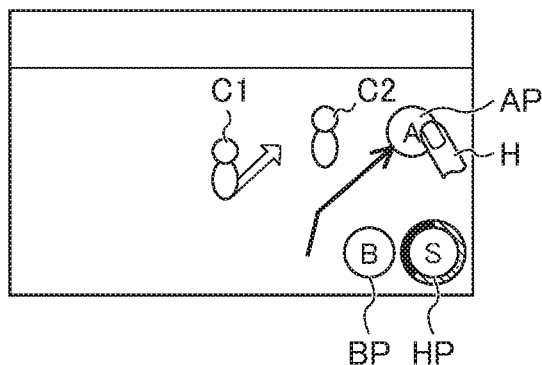

FIG. 3(c) shows an example of the case in which the character C1 in a game activates the same kind of skill as that in FIG. 3(b) but performs a different operation.

The case where the player wishes to cause the character C1 in the game to activate the skill A and performs a touch operation in a skill activation area (e.g., the skill button AP in FIGS. 3(a)-3(d)) for a skill, i.e., the case where a touch operation of the above-described operation kind c is performed, will be described.

Similarly to the case described above, when a touch operation by the player is detected, the touch operation management unit 61 determines whether or not the kind of the touch operation is the operation kind c on the basis of the touch start point of the touch operation.

In the example in FIG. 3(c), since the player performed the touch operation in a skill selection area, the touch operation indicates a skill-related instruction regardless of the order or timing of the touch operation. Such a touch operation performed in a skill selection area is a touch operation of the operation kind c.

Note that, even in this case, similarly to the case described above, the touch operation management unit 61 checks whether or not there is a touch operation already being managed at the time when the touch operation by the player is detected.

Then, in the case where the touch operation already being managed is not related to a skill-related instruction, the touch operation management unit 61 manages the detected touch operation as having the management number 1 or 2. The skill instruction acceptance unit 82 accepts the touch operation as a skill-related instruction.

Meanwhile, in the case where the touch operation already being managed is related to a skill-related instruction, the skill instruction acceptance unit 82 does not accept the touch operation as a skill-related instruction because the acceptance of skill-related instructions is deactivated.

In the example in FIG. 3(c), the player operates the skill button AP to issue a skill-related instruction for the skill A to the character C1.

That is, the player brings the finger H into contact with the skill button AP stuck to an initial position (touches the skill button AP). This makes the swipe transition to the first state, and the skill A is selected as a skill to be activated.

The player moves the skill button AP while keeping the finger H in contact with the skill button AP. This makes the swipe transition to the second state.

Then, in the second state of the swipe, the player moves the skill button AP while keeping the finger H in contact with the skill button AP, and releases the finger H from the touchscreen at a prescribed position. That is, the state of the swipe transitions from the second state to the third state.

The direction from the position touched by the finger H immediately before the time of this transition (immediately-preceding-frame touched position, i.e., the position of the immediately-preceding-position button TP, not shown in FIG. 3(c)) toward the position touched by the finger H at the time of this transition (latest-frame touched position, i.e., the position of the skill button AMP) is set as the activation direction of the skill. As a result, the character C1 activates the skill A toward the character C2 existing in the activation direction.

Next, a skill-activation-impossible period will be described with reference to FIG. 3(d).

In the example in FIG. 3(d), the skill A among various kinds of skills is in the skill-activation-impossible period (hereinafter referred to as a "cool time").

In this embodiment, once a skill is activated, it is possible to set a period during which the skill cannot be activated again until a certain length of time passes, which is so-called a cool time.

Figure 3D:
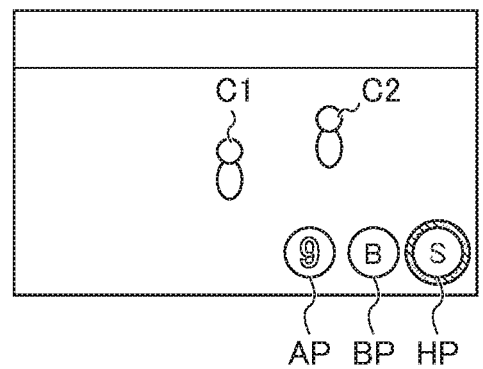

The example in FIG. 3(d) shows a situation immediately after the skill A is activated, and the number 9 is displayed on the skill button AP.

This indicates that the remaining cool time of the skill A is nine seconds, and the player cannot activate the skill A for the remaining nine seconds (the player cannot swipe the skill button AP).

Meanwhile, the highlighted area around the skill button HP (the hatched area in FIG. 3(d)) indicates the time until a killer technique can be activated.

The highlighted area increases over time, and when the entire area around the skill button HP becomes the highlighted area, the killer technique can be activated anytime.

Note that FIG. 3(d) indicates that the character C1 can activate the killer technique anytime.

As described above, in this embodiment, it is possible to set a cool time after activate a skill or a killer technique, and it is possible to notify a player of a period (time) before the skill can be activated, as appropriate.

In addition, there is no limitation on the means for notifying a player of a time before a skill can be activated, and any method may be used.

Next, game execution processing executed by the player terminal 1 in FIG. 2 will be described with reference to FIG. 4.

Figure 4:
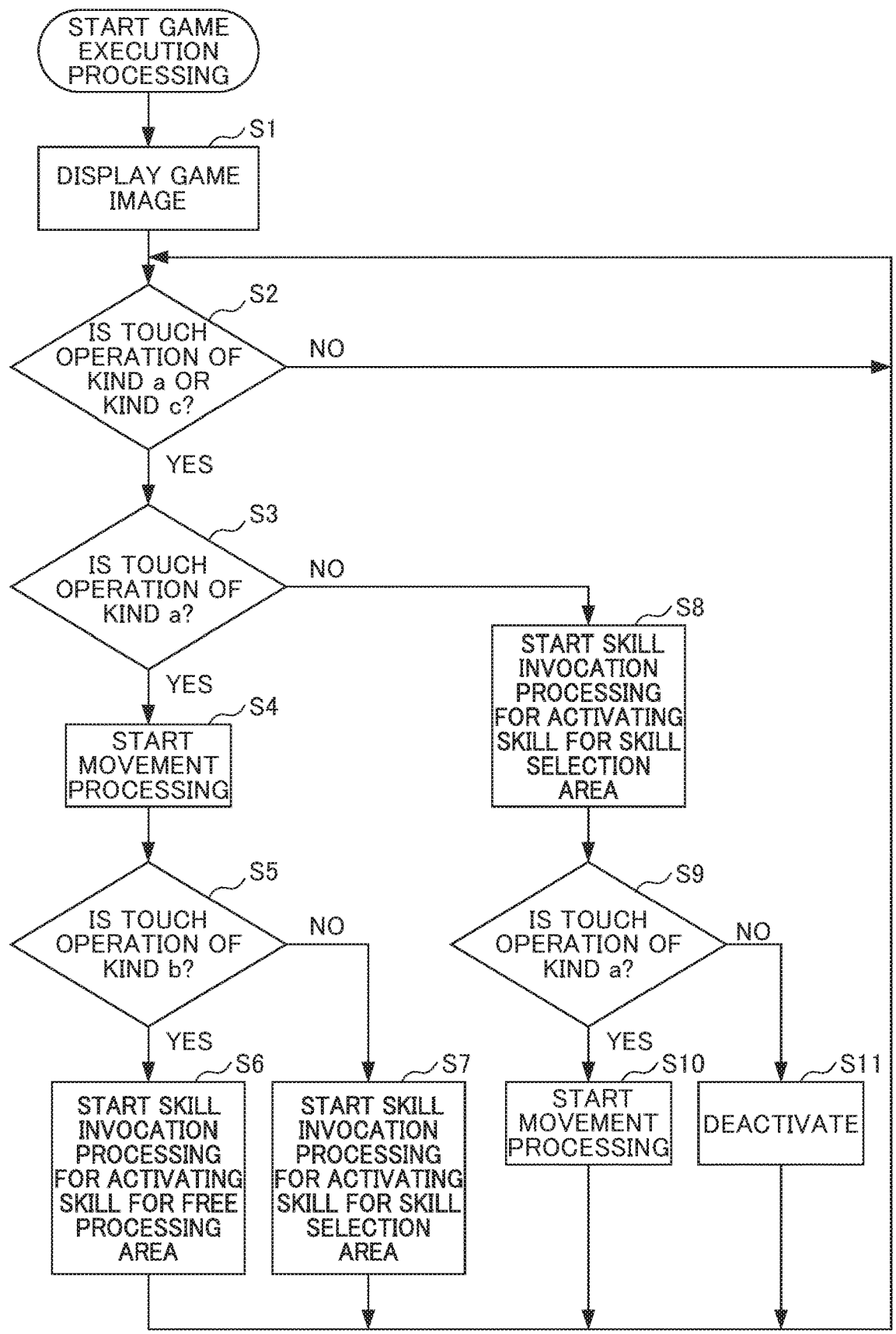
FIG. 4 is a flowchart showing the flow of the game execution processing executed on the player terminal in FIG. 2.

That is, FIG. 4 is a flowchart for explaining an example of the flow of the game execution processing.

In step S1, the display control unit 62 of the user interface control unit 51 displays a game image on the display unit 27.

In step S2, the touch operation management unit 61 determines whether or not a touch operation of the operation kind a or the operation kind c has been detected.

In the case where the touch operation of the operation kind a or the operation kind c has not been detected, the determination in step S2 results in NO, the processing returns to S2, and the determination processing in step S2 is repeated.

While the determination processing in step S2 is repeated, in the case where a touch operation of the operation kind a or the operation kind c is detected, the determination in the following step S2 results in YES, and the processing proceeds to step S3.

In step S3, the touch operation management unit 61 determines whether or not the kind of the touch operation detected in step S2 is the operation kind a.

In the case where the detected touch operation is of the operation kind c, the determination in step S3 results in NO, and the processing proceeds to step S8. The processing in and after step S8 will be described later.

Meanwhile, in the case where the detected touch operation is of the operation kind a, the determination in step S3 results in YES, and the processing proceeds to step S4.

In step S4, the movement instruction acceptance unit 81 accepts the touch operation detected in step S2 as a movement instruction and starts movement processing. The movement processing will be described in detail later with reference to FIG. 5.

In step S5, the touch operation management unit 61 determines whether or not the kind of the newly detected touch operation is the operation kind b.

In the case where the kind of the newly detected touch operation is the operation kind b, the determination in step S5 results in YES, and the processing proceeds to step S6.

In step S6, the skill instruction acceptance unit 82 accepts the touch operation newly detected in step S5 as a skill-related instruction, and starts skill activation processing for activating a skill for a free processing area by newly displaying a skill button, etc. The skill activation processing will be described in detail later with reference to FIG. 6.

Meanwhile, in the case where the kind of the newly detected touch operation is the operation kind c, the determination in step S5 results in NO, and the processing proceeds to step S7.

In step S7, the skill instruction acceptance unit 82 accepts the touch operation newly detected in step S5 as a skill-related instruction, and starts skill activation processing for activating a skill for a skill selection area (a different kind of skill from that in step S6). The skill activation processing will be described in detail later with reference to FIG. 6.

When the above-described processing in step S6 or S7 ends, the processing returns to step S2, and the subsequent processing is repeated.

As described above, in the case where the touch operation newly detected in step S2 is of the operation kind c, the determination in step S3 results in NO, and the processing proceeds to step S8. In this case, the following series of processing steps are executed.

That is, in step S8, the skill instruction acceptance unit 82 accepts the touch operation detected in step S2 as a skill-related instruction, and starts skill activation processing for activating a skill for a skill selection area. The skill activation processing will be described in detail later with reference to FIG. 6.

In step S9, the touch operation management unit 61 determines whether or not the kind of the newly detected touch operation is the operation kind a.

In the case where the detected touch operation is of the operation kind a, the determination in step S9 results in YES, and the processing proceeds to step S10.

In step S10, the movement instruction acceptance unit 81 accepts the touch operation newly detected in step S9 as a movement instruction and starts movement processing. The movement processing will be described in detail later with reference to FIG. 5.

Meanwhile, in the case where the detected touch operation is of the operation kind c, the determination in step S9 results in NO, and the processing proceeds to step S11.

In step S11, the skill instruction acceptance unit 82 does not accept a skill-related instruction related to the touch operation newly detected in step S9 because the acceptance of skill-related instructions is deactivated.

When the above-described processing in step S10 or S11 ends, the processing returns to step S2, and the subsequent processing is repeated.

Next, movement processing executed by the player terminal 1 in FIG. 2 will be described with reference to FIG. 5.

Figure 5:
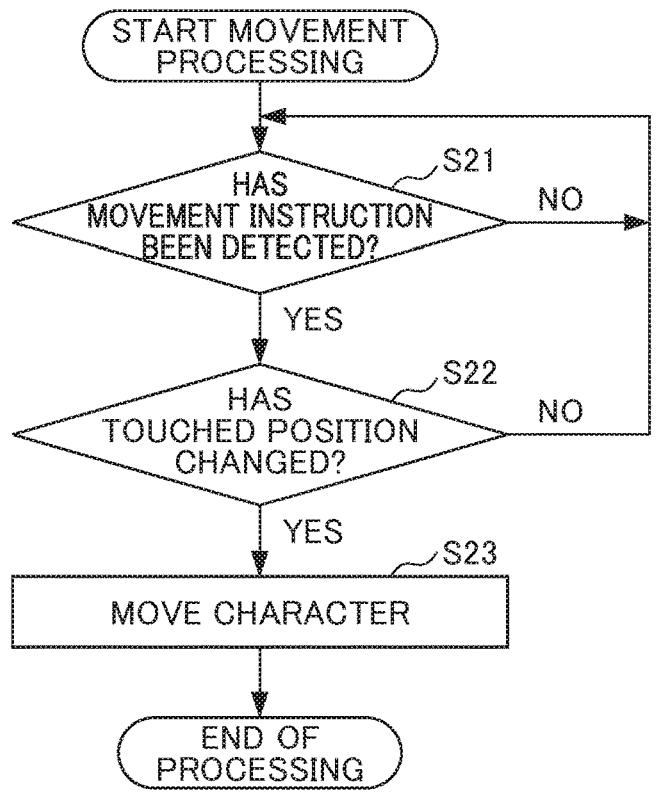
FIG. 5 is a flowchart showing the flow of movement processing executed on the player terminal in FIG. 2.

That is, FIG. 5 is a flowchart for explaining an example of the flow of the movement processing.

In step S21, the movement instruction acceptance unit 81 determines whether or not a movement instruction by the game execution processing in FIG. 4 has been accepted.

In the case where the movement instruction acceptance unit 81 has not accepted the movement instruction, the determination in step S21 results in NO, and the processing returns to S21.

Meanwhile, in the case where the movement instruction acceptance unit 81 has accepted the movement instruction, the determination in step S21 results in YES, and the processing proceeds to S22.

In step S22, the movement instruction acceptance unit 81 determines whether or not the touched position of the touch operation indicating the movement instruction has changed on the basis of the detection result of the state detection unit 71.

In the case where it is detected, by the state detection unit 71, that the touched position has not changed, the determination in step S22 results in NO, and the processing returns to step S21.

Meanwhile, in the case where it is not detected, by the state detection unit 71, that the touched position has changed, the determination in step S22 results in YES, and the processing proceeds to step S23.

In step S23, the display image generation unit 53 generates data of a game image in which a game character in a game moves in accordance with the change in the touched position, and the display control unit 62 displays the game image on the display unit 27.

Next, skill activation processing executed by the player terminal 1 in FIG. 1 will be described with reference to FIG. 6.

Figure 6:
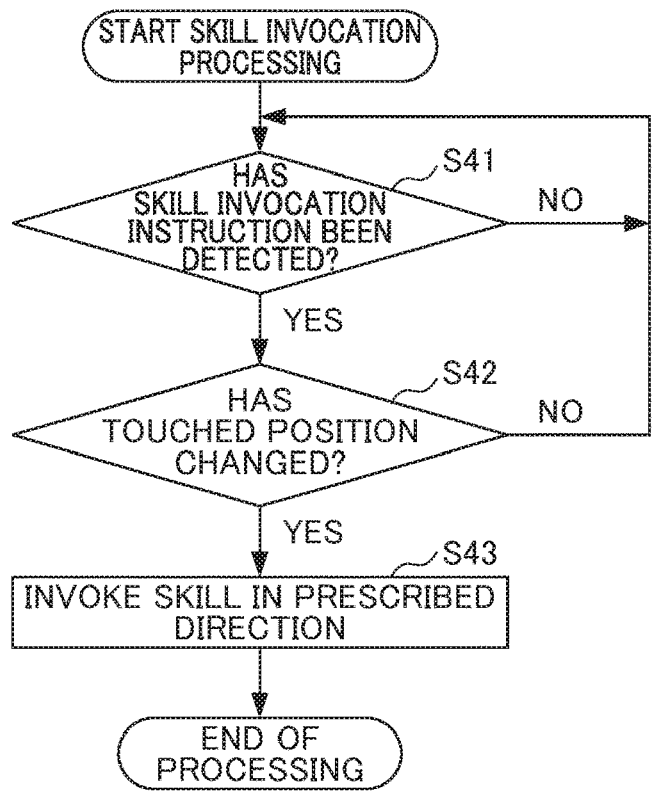
FIG. 6 is a flowchart showing the flow of skill activation processing executed on the player terminal in FIG. 2.

That is, FIG. 6 is a flowchart for explaining an example of the flow of the skill activation processing.

In step S41, the skill instruction acceptance unit 82 determines whether or not a skill-related instruction by the game execution processing in FIG. 4 has been accepted.

In the case where the skill instruction acceptance unit 82 has not accepted a skill-related instruction, the determination in step S41 results in NO, and the processing returns to S41.

Meanwhile, in the case where the movement instruction acceptance unit 82 has accepted a skill-related instruction, the determination in step S41 results in YES, and the processing proceeds to S42.

In step S42, the skill instruction acceptance unit 82 determines whether or not the touched position of the skill instruction has changed on the basis of the detection result of the state detection unit 71.

In the case where it is not detected, by the state detection unit 71, that the touched position has changed, the determination in step S42 results in NO, and the processing returns to step S41.

Meanwhile, in the case where it is detected, by the state detection unit 71, that the touched position has changed, the determination in step S42 results in YES, and the processing proceeds to step S43.

In step S43, the skill instruction acceptance unit 82 accepts the designation of a prescribed direction and invokes the skill in the prescribed direction in accordance with the movement direction of the touched position at the time when the touch operation has been released.

Although an embodiment of the present invention has been described above, it is to be noted that the present invention is not limited to the above-described embodiment and that modifications, improvements, etc. within a scope in which it is possible to achieve the object of the present invention are encompassed in the present invention.

For example, a method for the movement instruction or the skill-related instruction is not particularly limited to the above-described embodiment. Thus, some other embodiments in which different methods from the above-described embodiment are adopted will be described with reference to FIGS. 7 to 9.

Here, a different embodiment from the above-described embodiment will be described with reference to FIG. 7.

Figure 7:
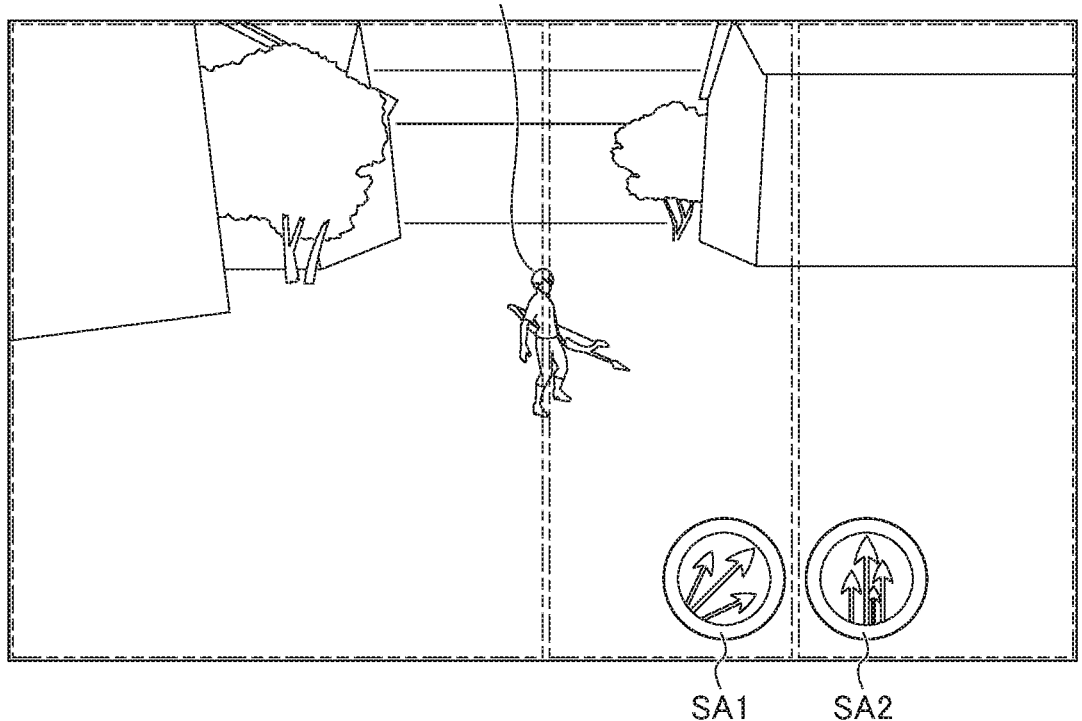
FIG. 7 is an illustration showing an example of the result of the game execution processing executed on the player terminal in FIG. 2, which is a different example from that in FIGS. 3(a)-3(d).

FIG. 7 is an illustration showing an example of the result of game execution processing executed on the player terminal 1 in FIG. 2, which is a different example from that in FIGS. 3(*a*)-3(*d*).

In the state in FIG. 7, a character GC serving as a game character in a game is in a state of waiting. In addition, in the example in FIG. 7, approximately the left half of the display surface of the touchscreen is defined as a free processing area, and approximately the right half (except for areas in which a skill button SA1 and a skill button SA2 are arranged in advance) is defined as skill selection areas for the skill A and a skill A2.

That is, in the above-described embodiment, the kind of a touch operation is determined on the basis of the position at which and the order in which the touch operation has been detected, whereas in the example in FIG. 4, the kind of the touch operation is determined on the basis of only the position at which the touch operation has been detected.

When a touch operation by a player is detected, the touch operation management unit 61 determines properties of the touch operation (e.g., determines whether the touch operation is a touch operation related to movement or a touch operation related to a skill, etc.) from information related to the position at which the touch operation has been detected, and performs management of these individual touch operations.

From this state, when a finger, etc. of the player is brought into contact with the touchscreen, the state of a swipe transitions to the first state.

Here, in the case where the detected touch operation is an operation for a movement instruction, the swipe is accepted as a movement instruction. Meanwhile, in the case where the detected touch operation has been started in a skill selection area, the swipe is accepted as a skill-related instruction.

In addition, a different embodiment from the above-described embodiment will be described with reference to FIGS. 8 and 9.

Figure 8:
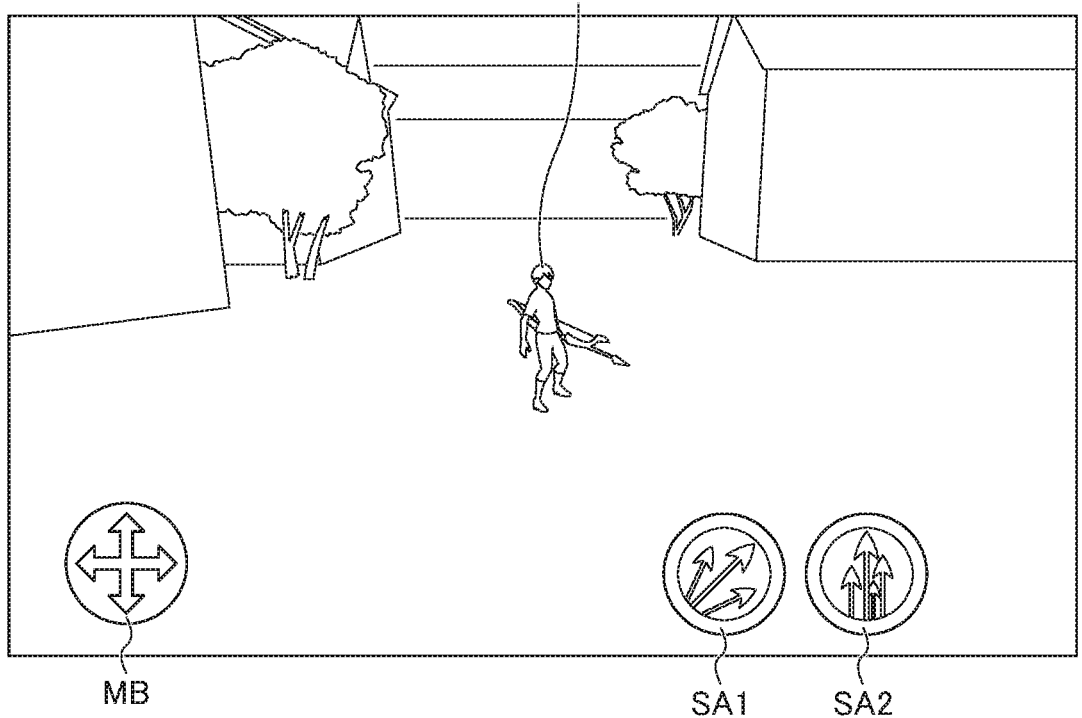
FIG. 8 is an illustration showing an example of the result of the game execution processing executed on the player terminal in FIG. 2, which is a different example from that in FIGS. 3(a)-3(d) or 7.
Figure 9:
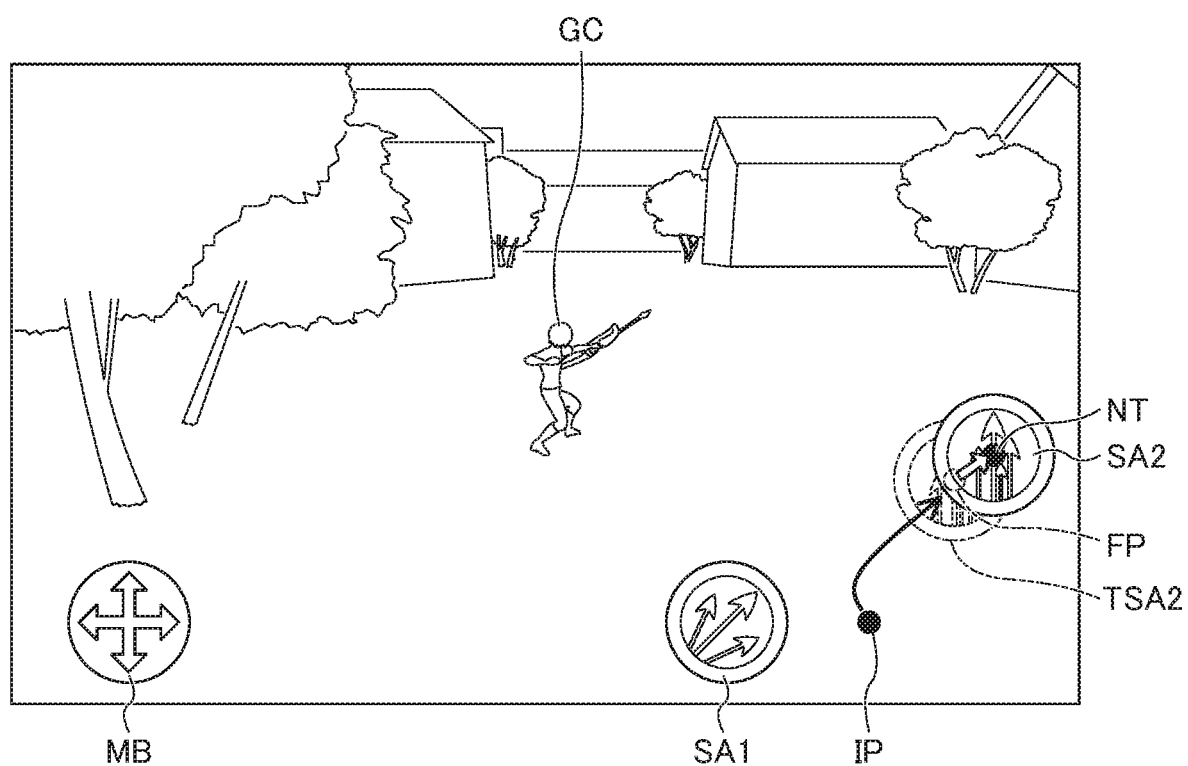
FIG. 9 is an illustration showing an example of the result of the game execution processing executed on the player terminal in FIG. 2, which is a different example from that in FIG. 3(a)-3(d) or 7.

FIGS. 8 and 9 is an illustration showing an example of the result of game execution processing executed on the player terminal 1 in FIG. 2, which is a different example from that in FIG. 3(*a*)-3(*d*) or 7.

In the example in FIGS. 8 and 9, a controller MB for accepting a movement instruction (hereinafter referred to as a "movement button MB") is displayed at a prescribed reference position regardless of whether or not a touch operation has been performed by a player.

For example, in the case where a player performs a touch operation on the movement button MB and the touch operation is started, i.e., in the case where the touched position at the time when the touch operation management unit 61 has detected the touch operation is within an area in which the movement button MB is displayed (hereinafter referred to as a "movement selection area"), the touch operation management unit 61 determines the touch operation to be a touch operation for a movement instruction, and the movement instruction acceptance unit 81 accepts the touch operation as a movement instruction.

The player can freely issue a movement instruction to the character GC by performing a swipe operation while keeping the contact (touch) with the movement button MB.

That is, by coordinating the movement button MB the position of which changes with the motion of the character GC in accordance with the change direction of the position touched by the player, the player can freely issue a movement instruction to the character GC in a virtual space.

In addition, a player intending to issue an activation instruction for the skill A2 touches the skill button SA2 arranged at an initial position IP in FIG. 9. In this case, the first state is detected as a swipe state.

Here, the skill button SA2 is a skill button for issuing a skill-related instruction for the skill A2, and the initial position IP thereof is within the skill selection area of the skill A2. Thus, in this case, the skill-related instruction for the skill A2 is accepted.

In addition, similarly to the case described above, the acceptance of skill-related instructions is deactivated.

As shown in FIG. 9, the player moves the skill button SA2 while keeping the contact of a finger with the skill button SA2. This makes the swipe transition to the second state.

Then, the player moves, in the second state of the swipe, the skill button SA2 while keeping the contact of the finger with the skill button SA2, and releases the finger from the touchscreen at a prescribed position NT. That is, the state of the swipe transitions from the second state to the third state.

The direction from the position touched by the finger immediately before the time of this transition (immediately-preceding-frame touched position, i.e., the position FP of the immediately-preceding-position button TSA2) toward the position touched by the finger at the time of this transition (latest-frame touched position, i.e., the position NT of the skill button SA2) is set as the activation direction of the skill A2. As a result, the character GC invokes the skill A2 toward the activation direction.

In addition, for example, in the plurality of embodiments described above, a touch operation on a movement selection area is defined as an operation indicating a movement instruction, and a touch operation on a skill selection area is defined as an operation indicating a skill-related instruction.

However, an action instruction defined by a touch operation on each area is not limited to the movement instruction or the skill-related instruction. For example, it is possible to define an instruction for any action such as a specific action (e.g., jump, etc.).

In addition to the above explanation, the defined areas are not limited to the movement selection area and the skill selection area, but it is possible to define three or more separate areas, and to associate action instructions with the individual areas.

For example, it is possible to separate a game image into three operation areas, i.e., an upper, middle, and lower areas, and to associate three different instructions with these three areas, such that these instructions serve as conditions for a player to issue action instructions.

For example, in the embodiment shown in FIGS. 3(*a*)-3(*d*) and 7, a movement button (e.g., the movement button MP in FIG. 3(*a*)) is displayed on a user interface for the first time when a touch operation by a player is detected, but the movement button may be displayed on the user interface from the start regardless of whether or not the touch operation has been performed by the player.

In this case, it is possible to define an area in which the movement button is displayed (stuck) as a movement selection area, and all the other areas as skill selection areas.

In addition, in the above-described embodiment, a skill button is arranged to stick to an initial position for a certain period of time, but there is no particular limitation to this embodiment and, for example, the skill button may be displayed for the first time when a touch operation by a player is detected.

For example, in the plurality of embodiments described above, transition of a swipe to another state (specifically, from the third state of the swipe is reached to the state of a skill invocation instruction) occurs when a player releases a finger (or a stylus, etc.), but the condition for transitioning a swipe to another state is not limited to this condition.

In addition, for example, in the case where a touch operation has not been updated for a certain period of time (a timeout has occurred) or in the case where some kind of situation change has occurred in a game, it is possible to transition from one state to another state.

For example, in the plurality of embodiments described above, the case where the direction of a movement instruction and the direction of a skill-related instruction are instructed at the same timing is not described. However, for example, it is possible to control the orientation of a game character by giving the direction of the skill-related instruction a higher priority.

This makes it possible for a user to easily identify the direction in which the skill is activated.

For example, in the plurality of embodiments described above, in the case where touch operations indicating skill-related instructions are performed overlappingly, skill-related instructions are deactivated so as not to accept these skill-related instructions. However, for example, it is possible to accept the latter-executed touch operation processing as a skill-related instruction, or to deactivate not only skill-related instructions but also movement instructions.

Here, in the above-described embodiment, in the case where the above-described multi-touching is performed by a player, the touch operation management unit 61 manages the order, etc. of these individual touch operations.

The management state of the number of the objects that are in contact with or in proximity to the display medium refers to the management state of such touch operations managed by the touch operation management unit 61.

The touch operation management unit 61 determines whether to accept a movement instruction or a skill-related instruction to a game character on the basis of such a management state and positions at which the touch operations have been performed, etc.

However, the method for determining an instruction to be accepted, as described above, is not limited to the above-described method. For example, it is possible to freely make a change as in the embodiment shown in FIGS. 7 to 9.

Here, for example, the series of processing steps described above may be executed either by hardware or by software.

In other words, the functional configuration in FIG. 2 is only an example, and there is no particular limitation to this example.

That is, it suffices that an information processing system be provided with functions that enable the execution of the above-described series of processing steps as a whole, and the choice of functional blocks for implementing the functions is not particularly limited to the example in FIG. 2. Furthermore, the locations of the functional blocks are not particularly limited to those in FIG. 2 and may be arbitrarily set.

Furthermore, each functional block may be implemented by hardware alone, by software alone, or by a combination of hardware and software.

In the case where the series of processing steps is executed by software, a program constituting the software is installed on a computer, etc. via a network or from a recording medium.

The computer may be a computer embedded in special hardware.

Alternatively, the computer may be a computer that can execute various functions when various programs are installed thereon, such as a server or a general-purpose smartphone or personal computer.

A recording medium including such a program is implemented by a removable medium (not shown) that is distributed separately from the main unit of the apparatus in order to provide the program to a player, a recording medium that is provided to a player as embedded in the main unit of the apparatus, etc.

In this specification, steps dictated in the program recorded on the recording medium may include not only processing that is executed sequentially in order of time but also processing that is not executed sequentially in order of time but is executed in parallel or individually.

Furthermore, in this specification, the term "system" should be construed to mean an overall apparatus constituted of a plurality of devices, a plurality of means, etc.

In other words, an information processing program to which the present invention is applied may be embodied in various forms configured as follows, including the information processing system according to the above-described embodiment in FIG. 2.

That is, it suffices for the information processing program to which the present invention is applied to be an information processing program that causes the execution of information processing by a computer that executes control to display, on a display medium, an image including a virtual space and a moving object that can move in the virtual space, the control processing including:

a detection step (e.g., step S2 in FIG. 4) of detecting an operation of bringing one or more objects into contact with or in proximity to the display medium;

a determination step (e.g., step S21 in FIG. 5 and step S41 in FIG. 6, etc.) of determining whether to accept a first instruction, which is an instruction related to a movement of the moving object in the virtual space, or to accept an instruction related to the moving object and including at least the selection of a kind and the designation of a direction as a second instruction, on the basis of a management state of the number of the one or more objects that are in contact with or in proximity to the display medium and individual positions of the objects corresponding to the number in the display medium; and an acceptance step (e.g., step S22 in FIG. 5 and step S42 in FIG. 6) of accepting the first instruction or the second instruction in accordance with the determination result in the determination step, wherein the detection step includes a step of detecting, as an operation accepted as the second instruction, a series of operations starting from a first state, in which, among the one or more objects, an object for the second instruction identified from the management state and the position has begun to be brought into contact with or in proximity to the display medium, via a second state, in which the object is moved while being maintained in contact with or in proximity to the display medium, to a third state, in which the form of the object with respect to the contact with or proximity to the display medium changes, and the acceptance step includes a step of accepting the selection of a prescribed kind among one or more kinds in accordance with the position of the object for the second instruction when the first state has been detected, accepting the designation of a prescribed direction in accordance with the movement direction of the object when a transition from the second state to the third state occurs, and, at a prescribed timing after the detection of the third state, accepting an instruction for the execution of the second instruction in the prescribed direction with respect to the prescribed kind.

Here, in the acceptance step, it is possible to deactivate the acceptance of the selection of the kind during the second state.

Thus, for example, since the acceptance of a new skill-related instruction is deactivated during a skill invocation, overlapping instructions for skill invocations are not issued.

In addition, the information processing program can further include a display control step of executing control to display a first controller for issuing the first instruction on the display medium, and to display a second controller for issuing the second instruction on the display medium.

This allows the first controller and the second controller to be displayed on a user interface, thereby making it possible for a player to simply and easily issue an instruction to a game character.

Here, the display control step includes a step of executing control to display, during the second state, the second controller at a present first position of the object and at a second position of the object at a prescribed timing therebefore, respectively.

In addition, the acceptance step can include a step of recognizing, as the prescribed direction, a direction from the second position toward the first position when a transition from the second state to the third state occurs, and accepting the designation of the recognized prescribed direction.

This makes it possible for a game character to invoke a skill in a prescribed direction while moving, etc., and also makes it possible for a player to issue various action instructions with a single swipe operation.

In addition, an information processing program to which the present invention is applied may be embodied in various forms configured as follows, including the information processing system according to the above-described embodiment in FIG. 2.

That is, the information processing device to which the present invention is applied is an information processing device that executes control to display, on a display medium, an image including a virtual space and a moving object that can move in the virtual space, the information processing device including:

a detection means (e.g., the touch operation management unit 61 in FIG. 2) for detecting an operation of bringing one or more objects into contact with or in proximity to the display medium;

a determination means (e.g., the touch operation management unit 61 in FIG. 2) that determines whether to accept a first instruction, which is an instruction related to a movement of the moving object in the virtual space, or to accept an instruction related to the moving object and including at least the selection of a kind and the designation of a direction as a second instruction, on the basis of a management state of the number of the one or more objects that are in contact with or in proximity to the display medium and individual positions of the objects corresponding to the number in the display medium; and an acceptance means (e.g., the movement instruction acceptance unit 81 and the skill instruction accepting unit 82 in FIG. 2) for accepting the first instruction or the second instruction in accordance with the determination result of the determination means, wherein the detection means includes a step (e.g., the state detection unit 71 in FIG. 2) for detecting, as an operation accepted as the second instruction, a series of operations starting from a first state, in which, among the one or more objects, an object for the second instruction identified from the management state and the position has begun to be brought into contact with or in proximity to the display medium, via a second state, in which the object is moved while being maintained in contact with or in proximity to the display medium, to a third state, in which the form of the object with respect to the contact with or proximity to the display medium changes, and the acceptance step includes a means (e.g., the movement instruction acceptance unit 81 and the skill instruction acceptance unit 82 in FIG. 2) for accepting the selection of a prescribed kind among one or more kinds in accordance with the position of the object for the second instruction when the first state has been detected, accepting the designation of a prescribed direction in accordance with the movement direction of the object when a transition from the second state to the third state occurs, and, at a prescribed timing after the detection of the third state, accepting an instruction for the execution of the second instruction in the prescribed direction with respect to the prescribed kind.

EXPLANATION OF REFERENCE NUMERALS

1 Player terminal
21 CPU
27 Display unit
51 User interface control unit
52 Acceptance unit
53 Display image generation unit
54 Display control unit
61 Touch operation management unit
62 Display control unit
71 State detection unit
81 Movement instruction acceptance unit
82 Skill instruction acceptance unit

The invention claimed is:

1. A non-transitory computer readable medium storing an information processing program that causes execution of control processing by a computer that executes control to display, on a display medium, an image including a virtual space and a moving object that can move in the virtual space, the control processing comprises functionality for:

detecting an operation of bringing one or more touch objects into contact with or in proximity to the display medium, wherein the display medium comprises a free processing area and a skill selection area that correspond to different areas of the virtual space;

determining whether to accept a movement instruction that is an instruction related to a movement of the moving object in the virtual space, or to accept a first skill instruction that is an instruction related to the moving object and comprising a selection of a kind of skill and a designation of a prescribed direction, wherein determining whether to accept the movement instruction or the first skill instruction is based on a management state of a number of the one or more touch objects that are in contact with or in proximity to the display medium and individual positions of the one or more touch objects in the display medium, wherein determining whether to accept the first skill instruction is further based on the first skill instruction being accepted after a predetermined period of time when a second skill instruction was executed, and wherein the kind of skill for the first skill instruction is the same as a kind of skill for the second skill instruction; and accepting the movement instruction or the first skill instruction in response to determining whether to accept the movement instruction or the first skill instruction, wherein processing for the movement instruction and the first skill instruction are both started in response to touch operations by the one or more touch objects in the free processing area, wherein detecting the operation comprises detecting, in response to the operation being accepted as the first skill instruction, a series of operations starting from a first state, in which a touch object among the one or more touch objects corresponds to the first skill instruction identified from the management state and the individual positions have begun to be brought into contact with or in proximity to the display medium, via a second state, in which the touch object is moved while being maintained in contact with or in proximity to the display medium, to a third state, in which a form of the touch object with respect to contact with or proximity to the display medium changes, and wherein the accepting of the movement instruction or the first skill instruction comprises:

selecting the kind of skill among one or more skill kinds in accordance with the position of the touch object for the first skill instruction when the first state has been detected, accepting the designation of the prescribed direction in accordance with a movement direction of the touch object when a transition from the second state to the third state occurs, and, at a prescribed timing after detecting the third state, and executing the first skill instruction in the prescribed direction with respect to the kind of skill.

2. A non-transitory computer readable medium storing an information processing program according to claim 1, wherein selecting the kind of skill is deactivated during the second state.

3. A non-transitory computer readable medium storing an information processing program according to claim 1, wherein the control processing further comprises functionality for controlling the moving object where in response to the movement instruction and the first skill instruction being accepted simultaneously or overlappingly, the orientation of the moving object is controlled in accordance with the designation of the prescribed direction accepted in the first skill instruction.

4. A non-transitory computer readable medium storing an information processing program according to claim 1, wherein the control processing further comprises functionality for displaying a first controller for issuing the movement instruction on the display medium, and to display a second controller for issuing the first skill instruction on the display medium.

5. A non-transitory computer readable medium storing an information processing program according to claim 4, wherein during the second state, the second controller is displayed at a present first position of the touch object and at a second position of the touch object at a prescribed timing before present, respectively, and wherein accepting the first skill instruction comprises recognizing, as the prescribed direction, the movement direction from the second position toward the first position when a transition from the second state to the third state occurs, and accepting the designation of the prescribed direction.

6. A non-transitory computer readable medium storing an information processing program according to claim 1, wherein the first skill instruction is accepted within the predetermined period of time after executing a third skill instruction, and wherein the kind of skill for the first skill instruction is different from a kind of skill for the third skill instruction.

7. A non-transitory computer readable medium storing an information processing program according to claim 1, wherein the predetermined period of time is displayed on the display medium after executing the second skill instruction.

8. An information processing method executed by an information processing device that executes control to display, on a display medium, an image including a virtual space and a moving object that can move in the virtual space, the information processing method comprising:
   detecting an operation of bringing a touch object into contact with or in proximity to the display medium, wherein the display medium comprises a free processing area and a skill selection area that correspond to different areas of the virtual space;
   determining whether to accept a movement instruction that is an instruction related to a movement of the moving object in the virtual space, or to accept a first skill instruction that is an instruction related to the moving object and comprising a selection of a kind of skill and a designation of a prescribed direction,
   wherein determining whether to accept the movement instruction or the first skill instruction is based on a management state of a number of touch objects that are in contact with or in proximity to the display medium and individual position of the touch object in the display medium,
   wherein determining whether to accept the first skill instruction is further based on the first skill instruction being accepted after a predetermined period of time when a second skill instruction was executed, and
   wherein the kind of skill for the first skill instruction is the same as a kind of skill for the second skill instruction; and
   accepting the movement instruction or the first skill instruction in response to determining whether to accept the movement instruction or the first skill instruction,
   wherein processing for the movement instruction and the first skill instruction are both started in response to touch operations by the one or more touch objects in the free processing area,
   wherein detecting the operation comprises detecting, in response to the operation being accepted as the first skill instruction, a series of operations starting from a first state, in which the touch object for the second instruction identified from the management state and the individual position has begun to be brought into contact with or in proximity to the display medium, via a second state, in which the touch object is moved while being maintained in contact with or in proximity to the display medium, to a third state, in which a form of the touch object with respect to contact with or proximity to the display medium changes, and
   wherein the accepting of the movement instruction or the first skill instruction comprises:
      selecting the kind of skill among one or more skill kinds in accordance with the position of the touch object for the first skill instruction when the first state has been detected,
      accepting the designation of the prescribed direction in accordance with a movement direction of the touch object when a transition from the second state to the third state occurs, and, at a prescribed timing after detecting the third state, and
      executing the first skill instruction in the prescribed direction with respect to the kind of skill.

9. An information processing device that executes control to display, on a display medium, an image including a virtual space and a moving object that can move in the virtual space, the information processing device comprising functionality for:
   detecting an operation of bringing one or more touch objects into contact with or in proximity to the display medium, wherein the display medium comprises a free processing area and a skill selection area that correspond to different areas of the virtual space;
   determining whether to accept a movement instruction that is an instruction related to a movement of the moving object in the virtual space, or to accept a first skill instruction related to the moving object and comprising a selection of a kind of skill and a designation of a prescribed direction,
   wherein determining whether to accept the movement instruction or the first skill instruction is based on a management state of a number of the one or more touch objects that are in contact with or in proximity to the display medium and individual positions of the touch objects in the display medium,
   wherein determining whether to accept the first skill instruction is further based on the first skill instruction being accepted after a predetermined period of time when a second skill instruction was executed, and
   wherein the kind of skill for the first skill instruction is the same as a kind of skill for the second skill instruction; and
   accepting the movement instruction or the first skill instruction in response to determining whether to accept the movement instruction or the first skill instruction, wherein processing for the movement instruction and the first skill instruction are both started in response to touch operations by the one or more touch objects in the free processing area, wherein detecting the operation comprises detecting, in response to the operation being accepted as the first skill instruction, a series of operations starting from a first state, in which a touch object among the one or more touch objects corresponds to the first skill instruction identified from the management state and the individual positions have begun to be brought into contact with or in proximity to the display medium, via a second state, in which the touch object is moved while being maintained in contact with or in proximity to the display medium, to a third state, in which a form of the touch object with respect to contact with or proximity to the display medium changes, and wherein the accepting of the movement instruction or the first skill instruction comprises:

selecting the kind of skill among one or more skill kinds in accordance with the position of the touch object for the first skill instruction when the first state has been detected, accepting the designation of the prescribed direction in accordance with a movement direction of the touch object when a transition from the second state to the third state occurs, and, at a prescribed timing after detecting the third state, and executing the first skill instruction in the prescribed direction with respect to the kind of skill.

\* \* \* \* \*